United States Patent [19]
Titterington et al.

[11] Patent Number: 5,645,888
[45] Date of Patent: Jul. 8, 1997

[54] REACTIVE INK COMPOSITIONS AND SYSTEMS

[75] Inventors: Donald R. Titterington, Tualatin; Loc V. Bui; Linda M. Hirschy, both of Portland; C. Wayne Jaeger, Beaverton, all of Oreg.

[73] Assignee: Tektronix, Inc., Wilsonville, Oreg.

[21] Appl. No.: 286,718

[22] Filed: Aug. 5, 1994

Related U.S. Application Data

[62] Division of Ser. No. 5,970, Jan. 19, 1993, Pat. No. 5,380,769.

[51] Int. Cl.⁶ .................... B05D 5/00; B05D 1/36; B05D 3/10; B41F 31/00
[52] U.S. Cl. .................. 427/256; 427/258; 427/261; 427/301; 427/333; 101/491
[58] Field of Search .................. 427/256, 261, 427/301, 333, 511, 150, 258; 101/491

[56] References Cited

U.S. PATENT DOCUMENTS

| | | | |
|---|---|---|---|
| 3,413,256 | 11/1968 | Bolstad et al. | 523/160 |
| 3,653,932 | 4/1972 | Berry et al. | 106/22 |
| 3,715,219 | 2/1973 | Kurz et al. | 106/22 |
| 4,326,005 | 4/1982 | Reed et al. | 428/201 |
| 4,390,369 | 6/1983 | Merritt et al. | 106/31 |
| 4,421,816 | 12/1983 | Arnold | 428/202 |
| 4,454,179 | 6/1984 | Bennett et al. | 428/41 |
| 4,503,111 | 3/1985 | Jaeger et al. | 428/195 |
| 4,538,156 | 8/1985 | Durkee et al. | 346/21 |
| 4,547,405 | 10/1985 | Bedell et al. | 427/256 |
| 4,555,437 | 11/1985 | Tanck | 428/212 |
| 4,649,064 | 3/1987 | Jones | 427/256 |
| 4,659,383 | 4/1987 | Lin et al. | 106/27 |
| 4,673,303 | 6/1987 | Sansone et al. | 400/126 |
| 4,684,956 | 8/1987 | Ball | 346/1.1 |
| 4,731,647 | 3/1988 | Kohashi | 358/75 |
| 4,743,920 | 5/1988 | Tohma et al. | 346/71 |
| 4,833,530 | 5/1989 | Kohashi | 358/78 |
| 4,889,560 | 12/1989 | Jaeger et al. | 106/27 |
| 4,889,761 | 12/1989 | Titterington | 428/195 |
| 4,992,304 | 2/1991 | Titterington | 427/164 |
| 5,017,644 | 5/1991 | Fuller et al. | 524/612 |
| 5,087,603 | 2/1992 | Izubayashi et al. | 503/226 |
| 5,099,256 | 3/1992 | Anderson | 346/1.1 |
| 5,108,505 | 4/1992 | Moffatt | 106/25 |
| 5,129,948 | 7/1992 | Breton et al. | 106/22 |

FOREIGN PATENT DOCUMENTS

| | | | |
|---|---|---|---|
| 0049678 | 3/1982 | Japan | 523/161 |
| 0191773 | 11/1983 | Japan | 523/160 |

*Primary Examiner*—Shrive Beck
*Assistant Examiner*—Fred J. Parker
*Attorney, Agent, or Firm*—Ralph D'Alessandro

[57] ABSTRACT

Reactive ink compositions of the present invention utilize at least two reactive components, a base ink component and a curing component, that are applied to a receiving substrate separately. The base ink component includes an ink carrier, a compatible colorant, and a cross-linkable constituent, and the curing component is a cross-linking agent. Upon exposure of the base ink component to the curing component, at least a portion of the ink is cross-linked to provide a printed image that is durable and abrasion-resistant.

18 Claims, 1 Drawing Sheet

REACTIVE INK COMPOSITIONS AND SYSTEMS

This application is a division of application Ser. No. 08/005,970, filed Jan. 19, 1993, now U.S. Pat. No. 5,380,769 issued Jan. 10, 1995.

TECHNICAL FIELD

The present invention relates generally to reactive ink compositions having at least two components that are applied separately to a receiving substrate. The present invention relates more specifically to reactive ink compositions including a base ink component that is printed on a receiving substrate using ink jet printing techniques to provide a visible image and a reactive curing component applied separately to the receiving substrate or the printed image to produce a cross-linked ink layer.

BACKGROUND OF THE INVENTION

Ink jet printers operate by ejecting ink onto a receiving substrate in controlled patterns of closely spaced ink droplets. By selectively regulating the pattern of ink droplets, ink jet printers can be used to produce a wide variety of printed materials, including text, graphics, images, and the like. Moreover, ink jet printers are capable of recording permanent images on a wide variety of substrates, including light reflective substrates such as various types and grades of paper, and light transmissive substrates such as transparencies.

Ink jet printers designed for use with various types of inks are well known in the art. Solvent-based inks, including both aqueous and non-aqueous, inks are well known. Images are formed by application of solvent-based inks to a receiving surface and subsequent removal, such as by evaporation or diffusion, of the solvent. Although solvent-based ink printing systems are suitable for some applications, their application is limited, primarily because the solvent tends to migrate into porous surfaces, thereby reducing the resolution of the printed image. Moreover, clogging of ink jet orifices as a result of solvent evaporation is a serious problem in solvent-based ink jet systems.

Phase change inks are solid at ambient temperatures and liquid at the elevated operating temperatures of an ink jet printing device. Ink jet droplets in the liquid phase are ejected from the printing device at an elevated operating temperature and rapidly solidify when they contact with the surface of a substrate to form the predetermined pattern. Phase change ink is advantageous for a variety of reasons. Problems associated with ink jet clogging resulting from solvent evaporation are largely eliminated, thereby improving the reliability of ink jet printing. Because the ink droplets solidify rapidly upon contact with the substrate, migration of ink along the printing medium is substantially reduced, and image quality and resolution is therefore substantially improved. Rapid solidification of phase change inks permits high quality images to be printed on a wide variety of porous and nonporous printing substrates.

Early references to phase change inks for ink jet printing involved monochrome inks jetted by electrostatic printing devices. Thus, for example, U.S. Pat. No. 3,653,932 discloses a low melting point (30° C. to 50° C.) ink having a base comprising di-esters of sebacic acid. In a similar process, U.S. Pat. No. 3,715,219 describes low melting point (30° C. to 60° C.) inks including a paraffin alcohol-based ink. One disadvantage of printing with low melting point phase change inks is that they are susceptible to softening and tend to exhibit offset problems. Specifically, when substrates printed with low melting point phase change inks are stacked or placed adjacent another surface, the ink tends to adhere to adjacent surfaces, particularly if the printed substrates are exposed to high temperatures.

U.S. Pat. Nos. 4,390,369 and 4,484,948 describe methods for producing monochrome phase change inks that employ a natural wax ink base, such as Japan wax, candelilla wax, and carnauba wax, which are printed using a drop-on-demand ink jet device at a temperature ranging between 65° C. and 75° C. U.S. Pat. No. 4,659,383 discloses a monochrome ink composition having an ink base including a C20-24 acid or alcohol, a ketone, and an acrylic resin plasticizer. These monochrome ink compositions are generally not durable and, when printed, become smudged upon routine handling and folding. U.S. Pat. No. 4,684,956 discloses phase change inks utilizing synthetic microcrystalline wax (hydrocarbon wax) and microcrystalline polyethylene wax. This molten composition can be applied to a variety of porous and non-porous substrates using drop-on-demand ink jet application techniques.

Color phase change ink jet systems have also been developed. Color ink jet printers typically utilize three primary color inks, in addition to black, that can provide a large spectrum of intermediate colors. Subtractive color mixing techniques utilizing cyan, magenta and yellow as primary colors are typically employed. European Patent Application Nos. 0187352 and 0206286 disclose phase change ink jet printing in color. The base inks for these systems include fatty acids, a thermoplastic polyethylene and a phase change material in the first application; and the alcohol portion of a thermosetting resin pair, a mixture of organic solvents (o- and p-toluene sulfonamide) and a dye in the second application.

Although ink jet printing using phase change inks generally produces high quality printing on light reflective substrates, ink jet printing of colored inks onto light transmissive media for displaying color images by overhead projection has been problematic. Special coatings are generally provided on light transmissive media to absorb solvent when solvent-based ink systems are used. See U.S. Pat. Nos. 4,503,111, 4,547,405, and 4,555,437. The development of phase change inks that are substantially transparent provides improved capability to print images on light transmissive substrates without requiring the use of special coatings. Phase change ink compositions disclosed in U.S. Pat. No. 4,899,761 are exemplary. As a consequence of the three-dimensional configuration of phase change ink droplets, however, phase change ink images projected by overhead projection generally do not exhibit high color saturation and clarity and may require reorientation after printing.

PCT Patent Application No. WO 88/08788 is directed to a method of treating transparencies printed with curved, light scattering ink droplets to improve their projection qualities. The printed ink droplets are overlaid with a transparent layer having an index of refraction that is substantially the same as the index of refraction of the ink droplets. Preferred coating materials include transparent polyurethane and acrylic. In this manner, the refractive effect of the curvature of the ink droplets is reduced.

U.S. Pat. No. 4,992,304 discloses a system for printing phase change ink on light transmissive substrates such as transparencies wherein an adhesion promoter layer is interposed between the substrate and ink layer. Adhesion promoter layers comprise a thermoplastic material, such as a thermoplastic polyamide.

In many ink jet printing systems, ink is printed directly onto the surface of the final receiving substrate. An ink jet printing system wherein an image is printed on an intermediate image transfer surface and subsequently transferred to the final receiving substrate is disclosed in U.S. Pat. No. 4,538,156 to Durkee et al. Inks having a polyhydric alcohol base colored with dyes that do not wet the surface of the intermediate transfer drum are disclosed for use with the ink jet printing system disclosed in the '156 patent.

U.S. Pat. Nos. 4,731,647 and 4,833,530 to Kohsahi disclose a system wherein a solvent is deposited on colorant to dissolve the colorant and form a transferable ink drop. The colorants and solvent are deposited directly onto paper or plastic colorant transfer sheets to form transferable ink droplets. The transferable drops are then contact transferred to a final receiving substrate, such as paper.

U.S. Pat. No. 5,099,256 to Anderson describes an ink jet printing system wherein ink is printed onto the surface of a thermally conductive intermediate drum. The intermediate drum surface is coated with a suitable film-forming silicone polymer allegedly having a high surface energy and high degree of surface roughness to prevent movement of the ink droplets after they have been applied to the intermediate surface. The drum surface is heated to dehydrate the ink droplets prior to transfer to the recording medium.

U.S. Pat. No. 4,743,920 discloses a thermal transfer recording system wherein ink forming a surface layer on an ink roll is selectively heated or softened to transfer ink onto a recording medium. Supercoolable, heat-transferable inks having a heat-fusible binder are used in this system. The ink binders are obtained by mixing supercoolable substances such as plasticizers with conventional heat-fusible binders such as thermoplastic resins, amide resins, natural or synthetic waxes, or the like.

U.S. Pat. No. 4,673,303 to Sansone et al. discloses an offset ink jet postage printing method and apparatus in which an inking roll applies ink to the first region of a dye plate. A lubricating hydrophilic oil is applied to the exterior surface of the printing drum or roll to facilitate transfer of printed images from the intermediate drum onto the receiving surface. The '303 patent also suggests that the ink can be modified to increase its viscosity after it has been applied to the surface of the drum upon exposure to electromagnetic radiation (visible or UV) or heat, or upon addition of a catalyst.

U.S. Pat. No. 5,087,603 relates to self-cross-linking aqueous resin dispersions obtained by emulsion-polymerizing a monomer composition in an aqueous medium. Cross-linking occurs upon evaporation of volatile components to produce a film coating having improved adhesive properties, water and solvent resistance, and durability.

U.S. Pat. No. 4,421,816 discloses a dry transfer decal in which a carrier layer is formed by application of mutually cross-linkable liquid prepolymers to a base sheet. The carrier layer is cross-linked by the action of heat or time, and ink layers are subsequently printed on the carrier coat in the desired decal pattern. Upon application of the decal to a receiving surface, the carrier film is exposed and protects the underlying ink layers from abrasion and degradation by exposure to solvents and the like.

U.S. Pat. No. 4,454,179 discloses a dry transfer article in which the ink component comprises a solvent-based ink, multi-component reactive ink, or actinic radiation curable ink. In multi-component reactive systems, reactive components are dissolved or dispersed in a suitable liquid medium, printed, solvent evaporated and then cured by reaction of the reactive components. Multi-component reactive ink systems involving combination of a reactive polyol resin and polyisocyanate to produce polyurethane inks are disclosed. Moreover, the '179 patent discloses that actinic radiation curable ink systems entail use of reactive prepolymers and monomers such as urethane acrylates responsive to actinic radiation (generally UV light) to effect curing.

Although many ink compositions and printing systems have been developed for various applications for electronic computer driven printers, the demand for increasingly higher resolution images and faster printing times, and the ability to print images on a variety of substrates, requires yet more refined ink compositions and ink jet printing systems. Specifically, there is a need for ink compositions and printing systems that can provide high resolution images on a variety of printing substrates at high printing rates. In addition to the foregoing requirements, it is also important that the printed ink image is flexible, durable and non-abradable.

SUMMARY OF THE INVENTION

Reactive ink compositions of the present invention utilize at least two reactive components, a base ink component and a curing component, that are applied to a receiving substrate separately. The base ink component is preferably applied to a receiving surface using ink jet printing techniques and, upon exposure of the base ink component to the curing component, a durable, cross-linked ink is produced.

The base ink component comprises a solvent-based (aqueous or non-aqueous) or phase change ink carrier, a compatible colorant, and a cross-linkable constituent. Phase change ink carriers are generally preferred for printing applications contemplated by the present invention because they produce high resolution images on a variety of receiving substrates. Solvent-based ink carriers having aqueous or non-aqueous ink carriers are also described below and may be preferred for certain applications. Colorants that are compatible with the ink carrier are used to provide the subtractive primary colors. One or more cross-linkable constituents is also incorporated in the base ink component. Under circumstances where the cross-linkable constituent and the cross-linking agent are unreactive until a catalyst or other curing agent is introduced, both the cross-linkable constituent and a cross-linking agent may be incorporated in the ink carrier while the catalyst serves as a curing component.

Curing components generally comprise a cross-linking agent or chain extender that is reactive with the cross-linkable constituent in the base ink component to form a cross-linked ink. Cross-linking agents that reversibly or irreversibly cross-link the ink composition may be employed. A cross-linking catalyst may be provided in the base ink component or the curing component, or it may be applied separately to a substrate or printed ink layer to accelerate the cross-linking reaction.

The base ink component is preferably applied to a receiving substrate using ink jet printing techniques. According to preferred embodiments, the base ink component is applied to an intermediate support surface using ink jet printing techniques and subsequently transferred to the desired receiving surface. The curing component may be applied to the intermediate support surface directly or in combination with an ink release agent. When the base ink component contacts the curing component applied to the intermediate transfer surface, a cross-linked ink interface region is formed at the surface of the printed ink layer adjacent the intermediate transfer surface. Upon transfer of the printed image from the intermediate support surface to the final receiving substrate, the cross-linked portion of the printed ink layer forms the outer, exposed layer of the printed substrate. An abrasion-resistant printed ink layer having enhanced durability is thereby provided.

BRIEF DESCRIPTION OF THE DRAWINGS

The features and advantages of the present invention will become apparent upon consideration of the following detailed disclosure of the invention, especially when taken in conjunction with the accompanying drawings, wherein.

DETAILED DESCRIPTION OF PREFERRED EMBODIMENTS

Reactive ink systems of the present invention feature a curing component comprising a cross-linking agent and a base ink component comprising a solvent-based or phase change ink carrier, a compatible colorant, and a cross-linkable constituent. The base ink component and curing component are applied to a receiving substrate separately and, upon contact with one another, produce a cross-linked printed product.

Base ink components suitable for use in the reactive ink compositions and systems of the present invention are applied to a receiving surface using any appropriate printing system, such as an ink jet or thermal wax printing system. Base ink components suitable for ink jet printing techniques must have certain physical and rheological properties. Specifically, ink jet printing techniques involve application of the base ink component to a receiving surface in a relatively low viscosity, liquid form. Upon or shortly after printing, the low viscosity liquid base ink dries and/or hardens to form a printed image that can be handled and manipulated. Thermal wax printing systems do not require ink to be jetted, but require transfer of ink in a liquid or semi-liquid form followed by rapid drying or hardening.

Ink jet printers and print heads suitable for use with the reactive ink compositions and systems of the present invention are well known. Solvent-based inks, both aqueous and non-aqueous, can be printed using both thermal-type ink jet and piezoelectrically actuated printheads which eject ink droplets onto a receiving substrate. The Hewlett-Packard Desk Jet printer, for example, ejects ink by heating it to form a bubble. Phase change inks are typically printed using a multi-orifice drop-on-demand ink jet printer that ejects ink droplets by compressing a chamber with a piezoelectric transducer, such as occurs in the Tektronix Phaser III printer.

Base ink components may be applied directly to the desired receiving surface, or they may be printed on an intermediate support surface and subsequently transferred to the final receiving substrate. The curing component is applied to the desired or intermediate receiving surface separately from the base ink component. For example, the curing component may be applied to the desired receiving surface or to an intermediate support surface as a coating prior to printing with (or transfer of) the base ink component. An exemplary imaging system using an intermediate receiving surface is disclosed, for example, in copending U.S. Pat. No. 5,389,958 issued Feb. 14, 1995, and assigned to the assignee of the present invention. Alternatively, the curing component may be applied to a surface of the printed base ink component after printing or transfer from an intermediate to a desired receiving surface.

Figure 1:
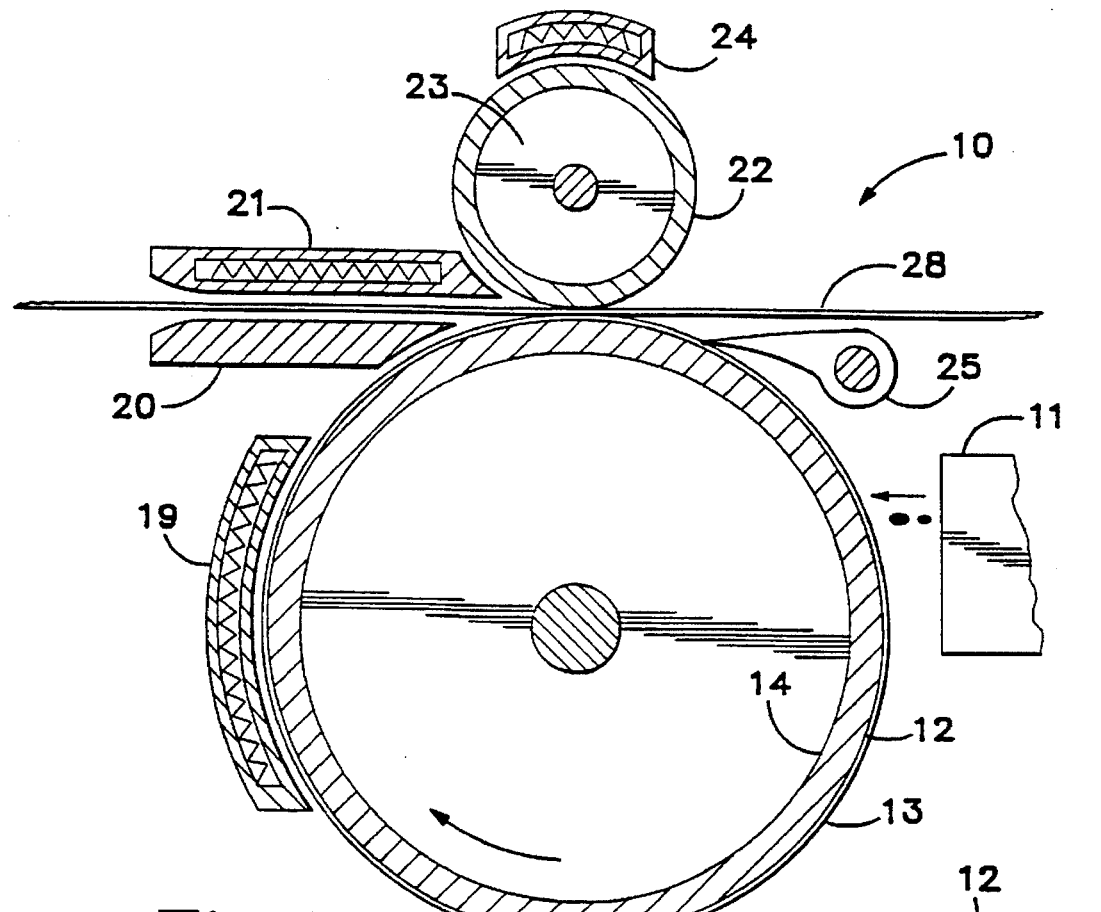
FIG. 1 illustrates a diagrammatic partially cross-sectional view of a printing system having an intermediate support surface for receiving an image from an ink jet print head and means for applying a release film layer.

FIG. 1 illustrates part of an exemplary printing system 10 adaptable for use with reactive ink compositions of the present invention in which an image is printed on an intermediate support surface and then transferred from the intermediate surface to a final receiving substrate. A printhead 11 is supported by an appropriate housing and support elements (not shown) for ejecting ink in a liquid or molten state in raster fashion onto an intermediate support surface 12 of rigid support 14. Printheads suitable for printing reactive ink base components of the present invention are known in the art, such as that disclosed in U.S. Pat. No. 5,087,930 issued Feb. 11, 1992 to Roy and assigned to the assignee of the present inventor.

Light reflective substrates such as various types and grades of paper and light transmissive substrates such as transparencies are appropriate substrates for use with reactive ink compositions and systems of the present invention. "Plain paper" is a preferred substrate, and paper such as that supplied by Xerox Corporation and many other companies for use in photocopy machines and laser printers is suitable. Many other commonly available office papers are included in this category of plain papers, including typewriter grade paper, standard bond papers, and letterhead paper. Xerox 4024 paper is a representative grade of plain paper for the purposes of this invention.

Rigid support 14 preferably takes the form of a curved surface such as a roller surface, although it may be provided as a web, platen, or the like. Rigid support 14 is constructed from relatively rigid materials, such as metallic aluminum-, nickel- or iron-containing materials; elastomeric materials such as fluoroelastomers, perfluoroelastomers, silicone rubber and polybutadiene; plastic materials such as polytetrafluorethylene loaded with polyphenylene sulfide; thermoplastics such as polyethylene, nylon, and FEP; thermosets such as acetals; or ceramics. Rigid support 14 may be formed from a laminar material comprising one or more of the compositions recited above, provided that intermediate support surface 12 is sufficiently smooth and rigid to deform the ink droplets 26, best seen in FIGS. 2 and 3, applied to support surface 12 in a substantially uniform manner when the final receiving substrate 28 passes between rigid support 14 and a fixing support 22. Anodized aluminum is a preferred material for rigid support 14.

The reactive base ink component of the present invention is applied to support surface 12 in the form of ink droplets 26. According to preferred embodiments, support surface 12 is coated with a chemical curing agent film 13 to facilitate cross-linking of cross-linkable ink droplets 26. Chemical curing agent films 13 may be produced by dispersing or dissolving the appropriate chemical curing agent (described below) in a release fluid that facilitates transfer of ink droplets 26 from support surface 12 to desired receiving surface 28. Even in reactive ink systems of the present invention wherein actinic radiation is employed as a curing agent or a chemical curing agent is applied directly to a printed surface, support surface 12 is preferably coated with a release film. Suitable release fluids for application to intermediate support surface 12 to facilitate transfer of ink droplets include water, fluorinated oils, glycol, surfactants, mineral oil, silicone oil, functional oils or combinations thereof. Functional oils may comprise, for example, mercapto-silicone oils, fluorinated silicone oils and the like.

Film applicator assembly 16 optionally comprises a reservoir and wicking pad 15 for applying film layer 13 to support surface 12. Suitable applicator assemblies may also employ a web and web advancing mechanism to periodically present fresh web for contact with support surface 12. Wicking pad 15 preferably comprises any appropriate nonwoven synthetic textile having a relatively smooth surface. Polyester webs are suitable. In a preferred configuration, smooth wicking pad 15 is mounted atop a porous supporting material 18, such as a polyester felt. Both materials are available from BMP Corporation as BMP products NR 90 and PE 1100-UL, respectively. Applicator apparatus 16 is mounted for retractable movement upward into contact with and downwardly out of contact with support surface 12 by means of an appropriate mechanism, such as an air cylinder or an electrically actuated solenoid. Suitable apparatus for applying a thin film to support surfaces are well known in the art.

The desired thickness of the film layer 13 on intermediate support surface 12 varies dependent upon the particular components in the cross-linking system and the printing system employed. The minimum thickness of the layer 13 is that required to achieve an effective transfer and can be as thin as about 0.05 microns. It is theorized that the layer 13 can be as thick as about 100 microns. The thickness of film layer 13 may generally be increased if textured support surfaces 12 are employed.

Some appropriately small quantity of film layer 13 on intermediate support surface 12 also is transferred to final receiving substrate 28 in areas adjacent transferred ink droplets 26. This transfer of the film layer is relatively nominal. More than one page of the final receiving substrate 28 may be processed before it is necessary to replenish the film layer on intermediate support surface 12.

FIG. 1 also illustrates a substrate guide 20 that facilitates passage of the final receiving substrate 28, such as paper, from a positive feed device (not shown) to a nip formed between the opposing arcuate surfaces of the fusing roller 23 and rigid support 14. Stripper fingers 25 (only one of which is shown) may also be pivotally mounted to printing system 10 to facilitate removal of final receiving substrate 28 from the exposed surface of rigid support 14.

Fusing roller 23 preferably comprises a rigid metallic core constructed, for example, from steel overlaid with a resilient elastomeric layer 22. Suitable elastomeric materials include silicones, urethanes, nitriles, EPDM and other resilient materials having a durometer of from about 40 to 45 Shore D. Elastomeric layer 22 engages the reverse (unprinted) side of final receiving substrate 28, while the ink layer printed on support surface 12 (and/or curing agent/release film 13) is transferred to the adjacent surface of final receiving substrate 28. Ink droplets 26 are thereby transferred to the surface of final receiving substrate 28 and simultaneously flattened and adhered to the surface of the receiving substrate. Using roller transfer systems, as illustrated, the printed ink image is conveniently transferred from one surface to another by rotation of the rollers in opposite directions.

Figure 2:
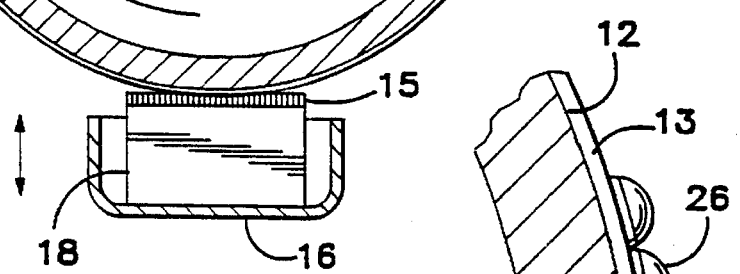
FIG. 2 illustrates an enlarged diagrammatic cross-sectional view of ink droplets applied to an intermediate transfer surface, with cross-linked portions of the ink droplets illustrated by cross-hatching.

FIG. 2 diagrammatically illustrates the reaction of a cross-linkable constituent in the base ink component forming droplets 26 with a curing component comprising a cross-linking agent or chain extender provided in film 13. The portions 29 of ink droplets 26 represent the cross-linking reactions that take place at the interface between the base ink component and an appropriate curing component. Similar cross-linking reactions would take place upon exposure of the base ink component to curing components using other techniques, such as exposure to actinic radiation or physical application of chemical cross-linking agents using ink jet printing techniques, or by spray, wiper or roller application, or the like. One of the benefits of the illustrated preferred embodiment is that the cross-linked portion of the ink droplets ultimately (i.e. after transfer to final receiving substrate 28) forms the exposed surface of the desired substrate.

Figure 3:
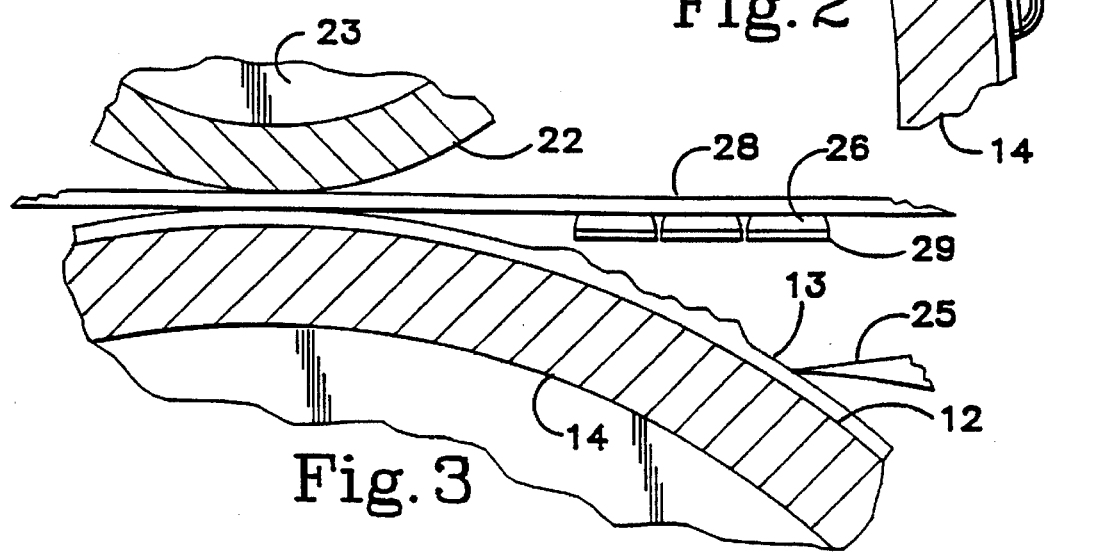
FIG. 3 illustrates an enlarged diagrammatic partially cross-sectional view of cross-linked ink droplets after they have been contact transferred from the intermediate support surface to a final receiving substrate.

FIG. 3 diagrammatically illustrates the sequence involved when cross-linked ink droplets 26 are transferred from film layer 13 on intermediate support surface 12 to final receiving substrate 28. As shown in FIG. 3, ink droplets 26 are transferred to final receiving substrate 28 with a small quantity of the film layer 13 attached thereto. Also, as noted above, upon transfer of cross-linked ink droplets to final receiving substrate 28, cross-linked portions 29, which are the most durable and abrasion resistant, are exposed to the environment.

Support surface 12 may optimally be heated by an appropriate heater device 19. Heater 19 may be a radiant resistance heater positioned as shown or, more preferably, positioned internally within rigid support 14. Heater devices 21 and 24 may also be employed in proximity to final receiving substrate guide 20 and/or in proximity to fusing roller 23, respectively. The desired temperature of the support surface 12 is dependent upon the composition of the film containing the cross-linking agent, the phase change ink, and their reactivity.

Heater 21 preferably preheats final receiving substrate 28 prior to contact transfer of ink droplets 26. It is theorized that heater 21 raises the temperature of final receiving substrates comprising plain paper to between about 50° C. and about 200° C. The thermal energy of final receiving substrate 28 is kept sufficiently low so as to minimize energy consumption and optimize the completion of cross-linking on final receiving substrate 28. Heater 24, when employed, heats the fixing roller 23 to a temperature of between about 25° C. and about 200° C. Heater 24 may alternatively be provided internally within roller 23.

In operation, support surface 12 has a film layer comprising a liquid layer containing an ink curing compound applied to its surface by the action of the applicator assembly 16. Assembly 16 is positioned in a raised application condition (as shown in FIG. 1) by an appropriate mechanism (not shown), such as an air cylinder, until the wicking pad 15 is in contact with support surface 12. A uniformly thick film is thereby deposited on the support surface 12. Rigid support 14 rotates about a journalled shaft in the direction shown by the arrow in FIG. 1, while the heater 19 heats the film layer and the surface of rigid support 14 to the desired temperature. Once a film layer 13 has been applied to support surface 12, the applicator apparatus is lowered to a non-contact position until application of another film layer is required.

Ink is applied to the exposed surface of film layer 13 by printhead 11. The ink is applied in molten state, with phase change ink having been melted from a solid state prior to printing by printhead 11. Phase change ink droplets 26 may solidify or be kept in liquid form on the film layer 13 as rigid support 14 continues to rotate. Cross-linking begins at interface 29 and preferably takes place as the rigid support 14 rotates and the ink droplets printed thereon approach the nip formed between rigid support 14 and fusing roller 23. Ultimately, ink droplets 26 are contact transferred to final receiving substrate 28 as they are deformed to their final image conformation and adhered to final receiving substrate 28. Ink droplets 26 are thus transferred and fixed to final receiving substrate 28 by application pressure and, optionally, heat. The image formed on final receiving substrate 28 by ink droplets 26 cools to ambient temperature and, at ambient temperature, possesses improved durability.

Reactive inks of the present invention may employ solvent-based (aqueous or non-aqueous) or phase change ink carriers. Phase change ink carriers are preferably in a solid form at ambient temperature and are converted to a molten state by the application of heat. Precise temperature requirements vary, of course, according to the ink composition, but typically range from about 85° C. to about 150° C. Maintaining the ink at temperatures above this range may cause degradation or chemical breakdown of the ink and is therefore undesirable. Suitable phase change ink carriers are described in copending U.S. patent application Ser. No. 07/981,647 filed Nov. 25, 1992, and assigned to the assignee of the present invention. Additionally, U.S. Pat. No. 4,889,560 issued Dec. 26, 1989, assigned to the assignee of the present invention, discloses useful ink carriers and is incorporated herein by reference in its entirety. The ink carrier composition is combined with a compatible colorant, preferably a compatible subtractive primary colorant. The subtractive primary colorants include four component dyes, namely, cyan, magenta, yellow and black. Preferably, the subtractive primary colorants comprise dyes from either class of Color Index (C.I.) Solvent Dyes or Disperse Dyes as described in the Color Index Revised Third Edition published by the Society of Dyers and Colourists in conjunction with the American Association of Textile Chemists and Colourists. Some C.I. Basic Dyes have also been successful by generating, in essence, an in situ Solvent Dye by the addition of an equimolar amount of sodium stearate with the Basic Dye to the phase change ink carrier composition. Acid Dyes and Direct Dyes have also been found to be compatible to a certain extent. Suitable colorants are disclosed in U.S. Pat. No. 4,889,560, issued Dec. 26, 1989, incorporated herein by reference.

In addition to the ink carrier and a compatible colorant, base ink components of the present invention additionally comprise a cross-linkable constituent and/or chain extender. Upon exposure of cross-linkable constituents in the reactive base ink components to selected cross-linking agents, the base ink component is cross-linked, at least in the area of exposure, to provide a cross-linked ink.

In general, one of three types of cross-linking systems may be used: irreversible chemical bond forming systems (covalent or non-covalent) using a chemical cross-linking agent; irreversible cross-linking systems using actinic radiation; or reversible cross-linking systems. Cross-linking catalysts may also be incorporated in one or both components of a reactive ink composition to accelerate cross-linking. The reactive ink compositions chosen for the particular reactive ink cross-linking system must, in addition to exhibiting desirable cross-linking characteristics, be compatible with the ink carrier and colorant and exhibit desirable stability and viscosity properties. Additionally, cross-linkable constituents must be stable and non-reactive with other base ink constituents such as plasticizers, tackifiers, viscosity modifiers, light stabilizers, anti-oxidants and the like, at operating temperatures.

Corresponding curing components comprising cross-linking agents or polymer chain extenders may be oil soluble, water soluble, organic, inorganic or metallic. Suitable curing components comprise a cross-linking agent or polymer chain extender and/or a cross-linking catalyst matched to the cross-linkable constituent contained in the base ink component.

Numerous cross-linking systems are known in the art and could be adapted for use in reactive ink compositions of the present invention. Exemplary irreversible covalent cross-linking systems include: phenol-formaldehyde resins such as resoles and novolacs; unsaturated and alkyd polyesters cured through oxidative cross-linking mechanism; epoxy resins cured with amines, amine-terminated polyamides, amidoamides, acid catalysts, tertiary amine catalysts, carboxylic acids, anhydrides and phenols; isocyanates cured with active hydrogen functionalities such as multi-functional hydroxyls or amines; vinyl esters cured with free radical initiators; amino resins such as urea-formaldehyde or melamine-formaldehyde cured with hydroxy functionalized resins in the presence of an acid; acrylics cured with various functional groups, including hydroxyl, glycidyl, carboxylic, isocyanate, oxazolidine and azividine; silicones cured with free radical initiators; and unsaturated hydrocarbons cured with sulfur or free radical initiators.

Exemplary non-covalent reversible cross-linking systems include: thermoplastic ionomers formed by curing an ethylene-acrylic acid copolymer with a Group I or II metal salt; elastomeric ionomers formed by reacting carboxylated EPDM rubbers with zinc or calcium rosin salt; ionomers formed by reacting styrene carboxylic acid copolymers with a Group I or II metal salt; polymers produced by dimerization of nitroso groups with unsaturated polymers; and polymers produced by treating carboxyl-containing polymers with acetic anhydride to initiate anhydride cross-linking.

Cross-linking may also be achieved by exposing to various forms of actinic radiation the cross-linkable constituent, which may be selected from monomers, oligomers, polymers or copolymers of the acrylate family, such as urethane or epoxy acrylates available commercially from the Sartomer Company of Exton, Pa. or Polysciences, Inc. of Warrenton, Pa. Any analagous compounds having acrylate functionality could also be employed. Some suitable forms of actinic radiation include, but are not limited to, cobalt 60; high and low energy electron accelerators; light energy (both UV and visible); infrared energy; plasma or glow discharge; and lasers. The photoinitiator or cross-linking agent in such a system could be selected from suitable benzophenones.

Ethylene-acrylic acid copolymers are a preferred cross-linkable constituent for use with phase change carriers such as those described in U.S. Pat. No. 4,889,560, assigned to the assignee of the present invention and incorporated herein by reference. Ethyleneacrylic acid copolymers having the following structures are especially preferred:

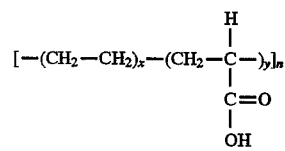

where
  x=from about 75% to about 99%; and
  y=from about 1% to about 25%.
The molecular weight of preferred ethylene-acrylic acid copolymers is from about 500 grams per mole to about 10,000 grams per mole and n is determined by the molecular weight. Such ethylene-acrylic acid copolymers are combined with the ink carrier and colorant composition in an amount from about 1 to about 30 weight percent.

Cross-linking agents suitable for cross-linking ethylene-acrylic acid copolymers include amines such as diethylenetriamine, 1,3-pentanediamine, 1,6-hexanediamine, polyoxypropylenediamine; and alcohols such as polyethylene glycol (PEG) and glycerol. Calcium acetate can be used as a catalyst in these systems.

Multi-functional silane compounds are especially preferred curing agents that can be carried by silicone oils and are reactive with ethylene-acrylic acid copolymers. Suitable "silane" compounds can include, but are not limited to, amines, alcohols, acids, expoxides or other appropriate functionalities dissolved or dispersed in silicone oil. Exemplary suitable silane compounds include dimethyldiacetoxysilane, methyltriethoxysilane, vinylmethyldiacetoxysilane, methyltrimethoxysilane, ethyltriacetoxysilane, dimethyltetramethoxydisiloxane, methyltriacetoxysilane, tetraethoxysilane, vinyltriacetoxysilane, tetramethoxysilane, silicon tetraacetate, tetrapropoxysilane, dimethyldiethoxysilane, 1,1,3,3-tetramethyl-1,3-diethoxydisiloxane, bis(N-methylbenzylamido)ethoxymethylsilane, bis(dimethylamino)dimethylsilane, bis(dimethylamino)methylvinylsilane, tris(dimethylamino)methylsilane, tris(cyclohexylamino)methylsilane, vinyltris(methylethylketoximine)silane, methyltris(methylethylketoxime)silane, vinyl tris(isopropenoxy) silane, tetramethyldisiloxane, 1,3,5,7-tetramethylcyclotetrasiloxane, methylhydrocyclosiloxanes, 1,3-divinyltetramethyldisiloxane, 1,3,5-trivinyl-1,1,3,5,5-pentamethyl trisiloxane, and tetravinyltetramethylcyclotetrasiloxane. Bis(dimethylamino)dimethylsilane and bis (dimethylamino)methylvinylsilane are preferred. A compound sold by Dow-Corning as 2-6020 silane (N-(β-aminoethyl) γ-aminopropyltrimethoxysilane) is especially preferred as a cross-linking agent for ethylene-acrylic acid copolymer cross-linkable constituents.

Although phase change reactive ink compositions are preferred for many applications, solvent (aqueous or non-aqueous) reactive ink compositions may be preferred for some applications. Aqueous inks are well known in the art and are disclosed, for example, in U.S. Pat. Nos. 5,129,948 and 5,017,644 assigned to Xerox Corporation and U.S. Pat. No. 5,108,505 assigned to Hewlett-Packard Company. A cross-linkable constituent such as polyvinyl alcohol, polyacrylic acid, polyacrylamide, polyethyleneimine, polyvinylpyrrolidone, or polyvinylpyrrolidone-co-acrylic acid copolymers could be incorporated in conventional aqueous solvent-based inks, for example, and cross-linked using a curing agent comprising a Group I or II metal ion such as sodium tetraborate decahydrate or sodium hydroxide (NaOH), respectively, carried by an aqueous surfactant solution. Dispersing or dissolving the curing agent in surfactant is desirable in many cases to wet an intermediate transfer surface.

Likewise, non-aqueous, oil-based reactive ink systems may also be used. Dimer acid, an oily bifunctional acid may, for example, be incorporated in an oil-based ink carrier as a cross-linkable constituent. Rosin dimer acid, a dimer of rosin abietic acid, may be a preferred cross-linkable constituent in oil-based inks. The curing component for this type of cross-linkable oil-based ink may comprise multi-functional alcohols, such as glycerol or polyvinyl alcohol, or polyamines dispersed or dissolved in non-aqueous surfactant solutions. Pentaerythritol may also be used as a curing component for an oil-based ink comprising dimer acid, and maleic anhydride may be employed as a catalyst. Another oil-based ink system may include a glycol constituent that is cross-linkable upon exposure to an isocyanate curing agent.

Several experiments were conducted to test the feasibility of reactive ink compositions and systems. The following examples are presented to illustrate the types of materials that can be successfully employed without limiting the invention to specific materials, structures or systems employed.

EXAMPLE I

Ethylene-acrylic acid (EAA) copolymer AC-5180 (available from Allied Signal) was mixed at about 50% by weight in a small aluminum pan with about 50% by weight ink carrier with colorant and heated to about 125° C. The colorant was about 1.9% by weight yellow dye SY 146 Orasol Yellow 4GN (C.I. Solvent Yellow 146) available from Ciba Geigy. The remainder of the ink carrier consisted of:

| | | |
|---|---|---|
| about 42.0% | S-180 monoamide | (Witco Chemical Co.) |
| about 21.5% | Unirez 2970 tetramide | (Union Camp) |
| about 27.0% | KE-311 Kemamide tackifier | (Witco Chemical Co.) |
| about 9.5% | Santiciser 278 plasticizer | (Monsanto Chemical Co.) |

The colored ink base component was kept over a hot plate and stirred manually for about 5 minutes or until the mixture became homogeneous. An excess amount of about 10% by weight diethylenetriamine (DETA) curing agent from a two-part epoxy resin sold by the Dexter Corporation under the tradename Epoxi-Patch was stirred into ink base mixture for about 1 minute over a hot plate until it formed a gel. The resultant mixture was spread in a thin film onto a piece of paper and was allowed to cool to ambient temperature.

The resulting yellow film was extremely hard, abrasion-resistant, tough and flexible upon folding of the paper. In contrast, a Phaser III ColorStix™ solid ink stick sold by Tektronix, Inc. produces a less hard, tough and abrasion-resistant film upon jetting from an ink jet printer onto paper substrate. However, the colored ink mixture with EAA was too viscous to jet from an ink jet device. To permit application of the colored base ink component using ink jet printing techniques, the viscosity of the base ink component must be reduced. This could be accomplished by reducing the EAA, tetramide and tackifier weight percentages, by reducing the molecular weight of the EAA, or both.

EXAMPLE II

A base ink component was made using the same procedure and weight percentages for the ink carrier and colorant composition as in Example I, except that the DETA curing agent was replaced with a mixture of the following constituents in the weight percentages shown below:

| | |
|---|---|
| about 60.0% | Glycerol |
| about 2.0% | Calcium acetate |

A dye having the same composition but substituting magenta for yellow colorant was also made.

The resulting dyes were applied to paper in a film as described above. Both the yellow and magenta inks were less abrasion-resistant than the film formed in Example I, although still tougher and more durable than the film formed by the ColorStix™ solid ink sticks upon jetting. The base ink components were still too viscous to be applied using ink jet printing techniques, and similar adjustments to the colored base ink components as suggested in Example I would be necessary to provide inks that could be applied using ink jet printing techniques.

EXAMPLE III

An ink composition according to the present invention was prepared as follows: about 177.27 grams of stearyl stearamide, about 17.75 grams of alkylbenzyl phthalate and about 40.10 grams of ethylene-acrylic acid copolymer were mixed in a 500 ml. beaker and heated with stirring to a temperature of 120° C. After a homogeneous solution of the materials was achieved, the molten phase change ink composition was filtered through a heated Mott apparatus using Whatman #3 filter paper and a pressure of 15 psi. The molten phase change ink was placed in a beaker at 105° C. About 1.91 grams of Orasol Yellow 4GN (C.I. Solvent Yellow 146) colorant from Ciba Geigy was added to the mixture, which was then stirred at about 105° C. for about 1 hour. The resulting ink composition was filtered in the heated Mott apparatus at about 100° C. The filtrate was poured into a mold, filtered through Whatman #3 filter paper and allowed to solidify to form solid ink sticks. The viscosity of the formulation was about 14 centipoises at about 140 degrees centigrade. This formulation is suitable for jetting from an ink jet device.

A dispersion of about 50% by weight of N-(-aminoethyl)-aminopropyltrimethoxysilane, available under the trade name Dow Corning Z-6020 silane, and about 50% by weight of silicone oil available under the trade name Dow Corning 200 was mixed together at room temperature.

The cross-linking reaction was conducted as follows: a test fixture having a rotatably mounted anodized aluminum drum and a diameter of about 4.13 inches was positioned adjacent and in close proximity to a transfer and fusing roller of smaller diameter. A piezoelectrically driven printhead loaded with phase change ink was positioned intermediate the drum and the transfer and fusing roller to deliver the primary colors of cyan, magenta, yellow and black to the exposed surface of a thin liquid layer of an intermediate support surface in raster fashion. The drum surface was coated with a liquid layer consisting of the dispersion of Dow Corning Z-6020 silane and Dow Corning 200 silicone oil described above. The dispersion was applied with a wick/felt laminate applicator having a steel backing plate. The drum temperature was maintained at about 65° C. Paper was used as the final receiving substrate and was preheated by an external heating device with a setpoint temperature setting of about 120° C. prior to being brought into contact with the transferred ink image. During imaging, the drum was rotated at a surface speed of about 33.3 inches per second. During transfer and fixing, the surface speed of the roller was about 5 inches per second. A full color solid yellow test image was imaged by the printhead on the liquid intermediate transfer layer and transferred to Xerox 4024 plain copy paper. The transferred image was of good quality.

The uniformity of the cross-linking reactions between the acrylic acid groups in the phase change ink composition and the functional silanes in the intermediate transfer layer was determined by the color shift of the printed image from a bright, vibrant yellow in the uncross-linked image to a reddish yellow in the cross-linked image. The color shift seem to be uniform across the page of the printed image. The ink was determined to be cross-linked because it remained insoluble in hot toluene. Cross-linked materials cannot be dissolved in any solvent, while uncross-linked phase change ink is very soluble in hot toluene.

EXAMPLE IV

An ink according to the present invention can be prepared as follows: Mix about 42.0% S-180 monoamide (Witco Chemical Co.); about 21.5% Unirez 2970 tetramide (Union Camp); about 9.5% Santiciser 278 plasticizer (Monsanto Chemical Co.); about 1.9% yellow dye Orasol Yellow 4GN (C.I. Solvent Yellow 146) (Ciba Geigy); and about 25.1% rosin dimer acid. Heat the mixture to a temperature of about 125° and stir until a homogeneous solution is achieved.

An excess amount of about 10% by weight diethylenetriamine (DETA) curing agent, from a two-part epoxy resin sold under the tradename Epoxi-Patch by the Dexter Corporation can be stirred into ink base mixture for about 1 minute over a hot plate until it forms a gel. The resultant mixture can be spread in a thin film onto a piece of paper and allowed to cool to ambient temperature. The resulting film would be tough, abrasion-resistant and durable, but the ink would be too viscous to apply using ink jet printing techniques.

While the invention has been described above with reference to the specific embodiments thereof, it will be apparent to skilled persons that many changes, modifications and variations may be made to the details of the invention described herein without departing from the underlying principles of the inventive concept disclosed. For example, it should be noted that the curing process employed with reactive ink systems of the present invention can be either a single step or a multi-step process. In a single step process the curing would occur during the transfer and fixing step of transferring the printed image from the intermediate transfer surface to the final receiving surface or substrate. In a multi-step process, the curing would occur at separate locations and at separate times, such as during the transfer and fixing step and during a subsequent post-processing step.

Also, it is possible that aqueous based inks could be employed where initially a gel is formed, such as by the reaction of a component in the ink, for example polyvinylpyrrolidone, and a component of the liquid layer to which the ink is applied, such as polyacrylic acid. Once sufficient heat of reaction is supplied, the cross-linking agent in the ink, such as polyethyleneimine, will cross-link with the carboxylic acid functionality of polyacrylic acid. The ink composition, in addition to water, can also include an appropriate biocide, glycerol, and a suitable coloring agent, such as a dye. The liquid layer can include a surfactant, in addition to water and the polyacrylic acid.

Accordingly, the spirit and broad scope of the appended claims is intended to embrace all such changes, modifications and variations that may occur to one of ordinary skill in the art upon a reading of the disclosure.

We claim:

1. A method for printing using a reactive ink composition in which a base ink component comprising a phase change ink carrier constituent and a cross-linkable constituent are applied to a substrate separately from a cross-linking agent, the method comprising:

using as the cross-linkable constituent one selected from the group consisting of ethylene-acrylic acid copolymer having the following structure

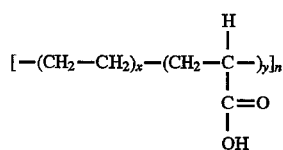

where
x=from about 75% to about 99%;
y=from about 1% to about 25%; and
a dimer acid;

applying the cross-linking agent to the surface of a receiving substrate to produce a coated surface; and subsequently applying the base ink component to the coated surface using ink jet printing techniques and, upon exposure of the cross-linkable constituent of the base ink component to the cross-linking agent of a curing component, producing a cross-linked ink layer.

2. A method according to claim 1, comprising using an ethylene-acrylic copolymer having a molecular weight of about 500 to about 10,000 grams/mole.

3. A method according to claim 1, comprising using a cross-linkable constituent that comprises from about 1 to about 30 weight percent of the base ink component.

4. A method according to claim 1, comprising using a cross-linking agent that is selected from the group consisting of: diethylene triamine; 1,3-pentanediamine; 1,6-hexandiamine; polyoxypropylenediamine; polyethylene glycol (PEG); and glycerol.

5. A method according to claim 1, comprising using a cross-linking agent that is a silane compound.

6. A method according to claim 5, comprising using a cross-linking agent that is selected from the group consisting of: dimethyldiacetoxysilane, methyltriethoxysilane, vinylmethyldiacetoxysilane, methyltrimethoxysilane, ethyltriacetoxysilane, dimethyltetramethoxydisiloxane, methyltriacetoxysilane, tetraethoxysilane, vinyltriacetoxysilane, tetramethoxysilane, silicon tetraacetate, tetrapropoxysilane, dimethyldiethoxysilane, 1,1,3,3-tetramethyl-1,3-diethoxydisiloxane, bis(N-methylbenzylamido) ethoxymethylsilane, bis(dimethylamino)dimethylsilane, bis(dimethylamino) methylvinylsilane, tris(dimethylamino) methylsilane, tris(cyclohexylamino) methylsilane, vinyltris(methylethylketoximine)silane, methyltris(methylethylketoxime)silane, vinyltris(isopropenoxy)silane, tetramethyldisiloxane, 1,3,5,7-tetramethylcyclotetrasiloxane, methylhydrocyclosiloxanes, 1,3-divinyltetramethyldisiloxane, 1,3,5-trivinyl-1,1,3,5,5-pentamethyl trisiloxane, and tetravinyltetramethylcyclotetrasiloxane.

7. A method according to claim 1, comprising using a cross-linking agent that is a silane compound.

8. A method according to claim 7, comprising using a cross-linking agent that is sodium tetraborate decahydrate or sodium hydroxide.

9. A method according to claim 7, comprising using an ink carrier constituent that is non-aqueous.

10. A method according to claim 9, comprising using a cross-linkable constituent that is rosin dimer acid.

11. A method according to claim 9, comprising using a cross-linking agent that is an alcohol or polyamine.

12. A method according to claim 1, wherein the receiving substrate is an intermediate support surface, and the cross-linked ink layer is transferred to a final receiving substrate.

13. A method according to claim 12, additionally comprising coating the intermediate support surface with a release fluid prior to applying the cross-linking agent and the base ink component.

14. A method according to claim 13, additionally comprising mixing the cross-linking agent with the fluid layer to produce a cross-linking release fluid, and applying the cross-linking release fluid to the surface of a receiving substrate prior to application of the base ink component.

15. A method according to claim 1, further comprising using a catalyst component in the reactive ink composition.

16. A method according to claim 5 wherein the silane compound is dissolved or dispersed in silicone oil.

17. A method according to claim 16 wherein the silane compound is selected from the group consisting of amines, alcohols, acids, and epoxides.

18. A method for creating a cross-linked ink pattern on a substrate comprising the steps of:

applying a release fluid having a cross-linking agent to a substrate support surface; and applying a base ink having at least an ink carrier, a colorant and a compatible cross-linkable constituent selected from the group consisting of an ethylene-acrylic acid copolymer having the following structure:

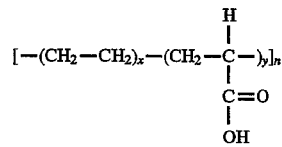

where
x=from about 75% to about 99%;
y=from about 1% to about 25%; and
a dimer add;

in a pattern over the substrate support surface so that the cross-linkable constituent in the base ink and the cross-linking agent in the release fluid will react to form a cross-linked ink pattern; and placing a substrate in contact with the substrate support surface such that the cross-linked ink pattern is transferred from the substrate support surface to the substrate.

* * * * *

UNITED STATES PATENT AND TRADEMARK OFFICE
CERTIFICATE OF CORRECTION

PATENT NO. : 5,645,888
DATED : July 8, 1997
INVENTOR(S) : Donald R. Titterington, et al It is certified that error appears in the above-identified patent and that said Letters Patent is hereby corrected as shown below:

Column 15, line 47, after "silane," and before "(isopropenoxy)" delete "vinyltris" and insert -- vinyl tris--;

Column 15, line 54, after "a" delete "silane compound" and insert -- Group I and II metal ion --;

Column 16, line 47, after "dimer" delete "add" and insert -- acid --.

Signed and Sealed this

Sixth Day of January, 1998

*Attest:*

*Attesting Officer*

BRUCE LEHMAN
*Commissioner of Patents and Trademarks*